United States Patent
Hardaa et al.

(10) Patent No.: US 9,387,839 B2
(45) Date of Patent: Jul. 12, 2016

(54) LARGE ANIMAL VEHICLE COLLISION SAFETY APPARATUS AND METHOD

(71) Applicant: VOLVO CAR CORPORATION, Goeteborg (SE)

(72) Inventors: Peter Hardaa, Torslanda (SE); Paer Nilsson, Moelndal (SE)

(73) Assignee: VOLVO CAR CORPORATION (SE)

( * ) Notice: Subject to any disclaimer, the term of this patent is extended or adjusted under 35 U.S.C. 154(b) by 230 days.

(21) Appl. No.: 13/862,814

(22) Filed: Apr. 15, 2013

(65) Prior Publication Data
US 2013/0275020 A1   Oct. 17, 2013

(30) Foreign Application Priority Data
Apr. 16, 2012   (EP) .................................... 12164235

(51) Int. Cl.
*B60T 7/22* (2006.01)
*B60R 21/01* (2006.01)
*B60R 21/0132* (2006.01)

(52) U.S. Cl.
CPC .......... *B60T 7/22* (2013.01); *B60R 2021/01259* (2013.01); *B60R 2021/01325* (2013.01); *B60R 2021/01327* (2013.01)

(58) Field of Classification Search
CPC ............ B60T 7/22; B60R 2021/01327; B60R 2021/01325; B60R 2021/01259
USPC .......................... 701/70, 45, 96, 301; 180/282
See application file for complete search history.

(56) References Cited

U.S. PATENT DOCUMENTS

| | | | |
|---|---|---|---|
| 5,732,374 A * | 3/1998 | Ohm ................................. 701/45 |
| 6,448,890 B1 * | 9/2002 | Cooper ........................... 340/438 |
| 6,784,792 B2 * | 8/2004 | Mattes et al. ................... 340/436 |
| 7,529,620 B2 | 5/2009 | Mattes et al. |
| 2004/0201275 A1 * | 10/2004 | Imai et al. ..................... 307/10.1 |
| 2004/0210367 A1 * | 10/2004 | Takafuji et al. ................. 701/45 |

(Continued)

FOREIGN PATENT DOCUMENTS

| | | | |
|---|---|---|---|
| DE | 10317440 | * 11/2004 |
| DE | 10317440 A1 | 11/2004 |

(Continued)

OTHER PUBLICATIONS

European Search Report Dated Sep. 19, 2012, Application No. 12164235.9-1523, Applicant Volvo Car Corporation, 5 Pages.

*Primary Examiner* — Marthe Marc-Coleman
(74) *Attorney, Agent, or Firm* — Brooks Kushman P.C.

(57) ABSTRACT

Embodiments herein relate to a large animal collision vehicle safety apparatus and method. At least one sensor detects a first acceleration in a longitudinal direction of a host vehicle. A first determination signal is generated from the detected acceleration. At least one further sensor detects a second acceleration in a vertical direction, and/or at least one still further sensor detects an angular velocity about an axis extending in a lateral direction of the host vehicle. A second determination signal is generated from the detected acceleration in a vertical direction. A third determination signal is generated from the detected angular velocity. Judging means judge whether the vehicle has suffered a large animal collision through at least comparing the first, second and/or third determination signals with preset reference signals. Braking intervention of the host vehicle is triggered when the vehicle is judged to have suffered a large animal collision.

19 Claims, 3 Drawing Sheets

(56) References Cited

U.S. PATENT DOCUMENTS

| | | | |
|---|---|---|---|
| 2005/0065688 A1* | 3/2005 | Rao et al. ......................... | 701/45 |
| 2006/0064220 A1* | 3/2006 | Murakami et al. ............... | 701/45 |
| 2007/0039772 A1* | 2/2007 | Stuve ............................ | 180/274 |
| 2009/0177322 A1* | 7/2009 | Librojo Garing .............. | 700/258 |
| 2012/0072073 A1* | 3/2012 | Groitzsch et al. ................ | 701/41 |
| 2013/0061653 A1* | 3/2013 | Wittmann et al. ............ | 73/12.04 |

FOREIGN PATENT DOCUMENTS

| | | |
|---|---|---|
| EP | 0649776 A2 | 4/1995 |
| EP | 0709256 A1 | 5/1996 |
| EP | 1724160 A1 | 11/2006 |
| EP | 1599367 B1 | 12/2006 |
| EP | 2261089 A1 | 12/2010 |
| GB | 2440451 A | 1/2008 |

\* cited by examiner

LARGE ANIMAL VEHICLE COLLISION SAFETY APPARATUS AND METHOD

CROSS-REFERENCE TO RELATED APPLICATIONS

This application claims foreign priority benefits under 35 U.S.C. §119(a)-(d) to German patent application number EP 12164235.9, filed Apr. 16, 2012, which is incorporated by reference in its entirety.

TECHNICAL FIELD

Embodiments herein relate to a large animal vehicle collision safety apparatus and method.

BACKGROUND

In some motorized countries there exist the risks of encountering quite large animals, such as e.g., moose, elks and other animals of similar size, when driving along in a motor vehicle. There is of course a risk of serious consequences should a collision occur between one's own vehicle and a large animal. Collisions with such large animals often occur at significant speeds, as the animals often move quite rapidly onto the road from the cover of surrounding vegetation.

An impact with a large animal in itself usually does not reduce the speed of the vehicle more than marginally. However, the ability of the driver to control the vehicle is usually significantly impaired. Thus, the risk of a secondary event becomes heightened. Such secondary events may involve other users of the road and may put the occupants of the vehicle suffering the large animal impact in a much worse situation than the original large animal collision caused. Such secondary events may even cause fatal single vehicle crashes, e.g., due to unintentional roadway departure, which accounts for high shares of traffic related fatalities.

The automotive industry has developed active safety systems that aim to prevent or mitigate accidents. One example is collision avoidance or mitigation systems that monitors the road ahead of the vehicle for potential collision threats and activate brakes of a vehicle prior to a potential impact. However, such systems may have difficulties in responding to the very rapid course of events if a large animal suddenly jumps onto the road in front of the vehicle. Furthermore, such systems may, even if they have responded and triggered application of the brakes of the vehicle, abort braking once the vehicle has suffered a collision with a large animal as there no longer exist any visible threat. Collision avoidance or mitigation systems have proven to be very efficient in reducing the amount of fatalities in traffic.

Further, there exist apparatuses for judging a collision type based on the particulars of a collision. Through EP0709256, an apparatus is previously known for judging an oblique, center pole and front barrier collision with the acceleration signals (Ax, Ay, Az) of a vehicle in longitudinal (X), lateral (Y) and vertical (Z) directions. The acceleration signals detected by acceleration sensors are filtered and transferred to a collision judging part. The acceleration signals detected by the acceleration sensors are integrated. Judgment for an oblique, center pole and front barrier collision is achieved by comparing the integrated acceleration signals with predetermined reference values.

SUMMARY

Embodiments herein aim to provide a large animal collision vehicle safety apparatus.

This is provided through at least one sensor for detecting a first acceleration in a longitudinal direction of a host vehicle; means for generating a first determination signal from the detected acceleration in a longitudinal direction of the host vehicle; at least one further sensor for detecting a second acceleration in a vertical direction and/or at least one still further sensor for detecting an angular velocity about an axis extending in a lateral direction of the host vehicle; means for generating a second determination signal from the detected acceleration in a vertical direction; means for generating a third determination signal from the detected an angular velocity about an axis extending in a lateral direction of the host vehicle; means for judging whether the vehicle has suffered a large animal collision through at least comparing the first, second and/or third determination signals with preset reference signals; and means for triggering braking intervention of the host vehicle when the vehicle is judged to have suffered a large animal collision.

The provision of braking intervention of the host vehicle when the vehicle is judged to have suffered a large animal collision provides for a reduction of the risk of a secondary event which may involve other users of the road and may put the occupants of the vehicle suffering the large animal impact in a much worse situation than the original large animal collision caused.

According to a second aspect the means for generating the first, second and third determination signals are arranged to generate these as first and second velocity signals and an angle signal through integrating the first and second accelerations and the angular velocity signal with respect to time.

The provision of the first and second determination signals as first and second velocity signals and an angle signal, improves the confidence of the judgment whether the vehicle has suffered a large animal collision through facilitating the comparison with preset reference signals.

According to a third aspect the means for generating the first, second and third determination signals further are arranged to generate these through integrating the first and second velocity signals and the angle signal with respect to time.

The provision of the first and second determination signals through further integrating, as described for the third aspect, further improves the confidence of the judgment whether the vehicle has suffered a large animal collision through facilitating the comparison with preset reference signals.

According to a fourth aspect at least one remote sensor is arranged to detect objects forward of the host vehicle and output signals representative thereof, and the means for judging whether the vehicle has suffered a large animal collision are arranged to include signals output from the at least one remote sensor in the large animal collision judgment.

The provision of at least one remote sensor, as described for the fourth aspect, still further improves the confidence of the judgment whether the vehicle has suffered a large animal collision through allowing the large animal collision judgment to be based on additional data.

According to a fifth aspect the at least one remote sensor comprises at least one of a RADAR technology sensor, a LIDAR technology sensor, a vision technology sensor or fusions of sensors based on one or more of these sensing technologies.

Basing the at least one remote sensor on at least one of a RADAR technology sensor, a LIDAR technology sensor, a vision technology sensor or fusions of sensors based on one or more of these sensing technologies, as described for the fifth aspect, provides for yet further improved confidence of the judgment whether the vehicle has suffered a large animal collision through enabling acquisition of complementary large animal presence data.

Further embodiments herein aim to provide a large animal vehicle collision safety method.

This is provided through a method comprising the steps of: detecting a first acceleration in a longitudinal direction of a host vehicle; generating a first determination signal from the detected acceleration in a longitudinal direction of the host vehicle; detecting a second acceleration in a vertical direction and/or detecting an angular velocity about an axis extending in a lateral direction of the host vehicle; generating a second determination signal from the detected acceleration in a vertical direction; generating a third determination signal from the detected an angular velocity about an axis extending in a lateral direction of the host vehicle; judging whether the vehicle has suffered a large animal collision through at least comparing the first, second and/or third determination signals with preset reference signals; and triggering braking intervention of the host vehicle when the vehicle is judged to have suffered a large animal collision.

The provision of braking intervention of the host vehicle when the vehicle is judged to have suffered a large animal collision provides for a reduction of the risk of a secondary event which may involve other users of the road and may put the occupants of the vehicle suffering the large animal impact in a much worse situation than the original large animal collision caused.

BRIEF DESCRIPTION OF THE DRAWINGS

In the following, embodiments herein will be described in greater detail by way of example only with reference to the attached drawings, in which.

DETAILED DESCRIPTION

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

In overview, embodiments herein, utilizes knowledge about the point of impact during large animal collisions in order to address some of the limitations of conventional active safety systems, which are not ready to handle this specific type of accident.

Large animals, in respect of the embodiments herein, relate to animals such as elk or moose and similar, i.e., animals of substantial weight and of such height that the bulk of their body weight normally will be situated above bonnet height of a vehicle colliding with them.

Figure 1:
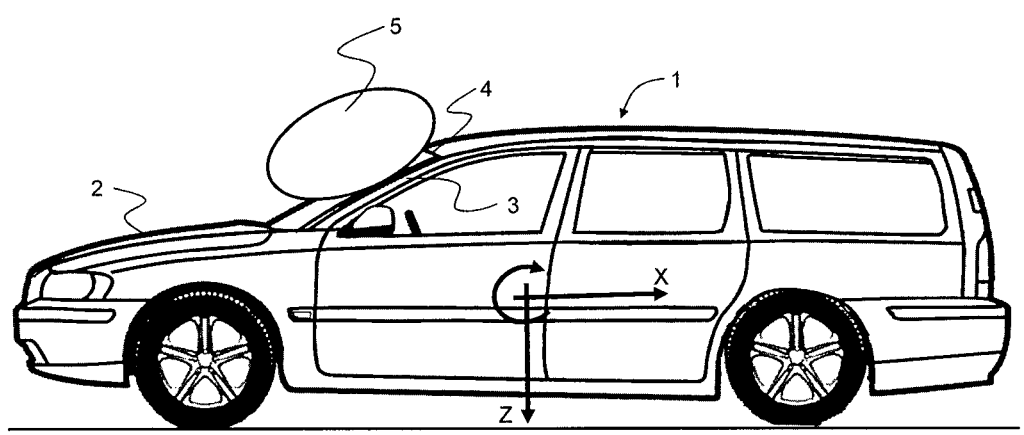
FIG. 1 is a schematic illustration of a vehicle suffering a large animal impact.

As illustrated in FIG. 1 the point of impact during large animal collisions, at least for a vehicle 1 having a standard height bonnet 2, is generally the A-pillars 3 and the leading edge 4 of the roof of the vehicle. This localization of the point of impact with a large animal 5 will cause a deceleration of the vehicle 1 in an x-direction (a longitudinal front-and-rear direction of the vehicle) while the rear suspension of the vehicle 1 will become heavily compressed due to pitch motion, i.e., angular velocity around an y-axis (a lateral direction of the vehicle), and acceleration in a z-direction (a vertical direction of the vehicle). Higher vehicles, such as sport utility vehicles (SUVs) may display a slightly different point of impact although with similar result.

Accordingly, embodiments herein utilize knowledge about the specific combinations of acceleration values and/or pitch angular velocity values indicative of a large animal collision in order to provide active safety measures following a collision between the vehicle and a large animal 5, such as e.g., an elk or similar size animal.

Knowledge about the specific combinations of acceleration values and/or pitch indicative of a large animal collision is obtained through simulations and/or full scale trials performed for the specific vehicle model. The obtained combinations are used to calibrate the apparatus described herein.

On-board sensors 10, 11, 12 are utilized to detect combinations of accelerations and/or pitch in order to obtain combinations for comparing with the known combinations. The sensors 10, 11, 12 relied on may be located in a Restraints Control Module (RCM) or provided at separate locations throughout the vehicle 1.

Accelerations in x and z directions $A_x$, $A_z$ may be obtained using accelerometers, such as those normally present in the Restraint Control Module (RCM) mentioned above. As a complement or alternative to the z-direction acceleration a gyro may be used to acquire the pitch motion, i.e., angular velocity around the y-axis, of the vehicle.

Figure 2:
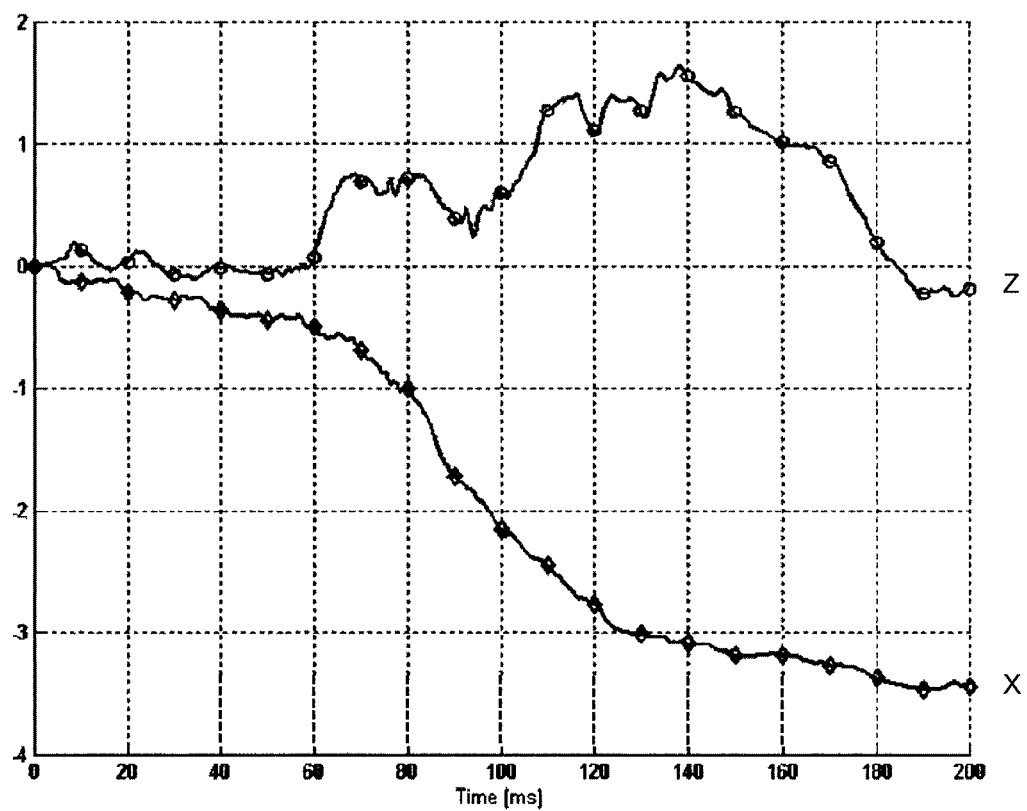
FIG. 2 is a schematic illustration of example X and Z direction velocity changes during a large animal impact event.

The acceleration values obtained $A_x$, $A_z$ may be used immediately or integrated, as illustrated in FIG. 2, in order to generate the references for judging a collision as a large animal collision. In FIG. 2 the acceleration values obtained $A_x$, $A_z$ have been transformed into velocity signals through integrating the first and second accelerations $A_x$, $A_z$ with respect to time. The uppermost curve illustrates example values obtained through integrating acceleration values $A_z$ obtained in a z-direction (a vertical direction of the vehicle) with respect to time. The lowermost curve illustrates example values obtained through integrating acceleration values $A_x$ obtained in an x-direction (a longitudinal direction of the vehicle) with respect to time.

It is further possible to integrate the values twice in order to create (e.g., distance based) reference thresholds for this judgment.

It may be necessary to filter the acceleration values obtained $A_x$, $A_z$ before use in order to eliminate high frequency components thereof.

Comparison of the obtained combinations with known combinations indicative of a large animal collision may be performed by a dedicated comparison unit 16 or alternatively by suitable means for performing such comparison integral to other vehicle systems.

Upon the comparison being positive a signal C will cause means for triggering braking intervention 18 to send a signal T to the braking system 19 of the vehicle 1, triggering braking thereof. This Post Impact Braking will normally be adapted to bring the vehicle 1 to a full stop.

The decision to activate Post Impact Braking may also be influenced by information from further vehicle sensors (not shown), such as sensors for acquiring information regarding conditions external to the vehicle 1 that an impact to a large animal 5 is imminent. Examples of such sensors are integrated Radar and Camera (RACam) System sensors. RACam Systems combines radar sensing, vision sensing and performs data fusion of the information acquired by such sensors for obtaining highly reliable decision support. Other examples are sensor systems such as vision systems (cameras), LIDAR (Light Detection And Ranging) systems, RADAR (RAdio Detection And Ranging) systems or similar. Information from these sensors may be utilized to improve the confidence of the decision to trigger Post Impact Braking.

Figure 3:
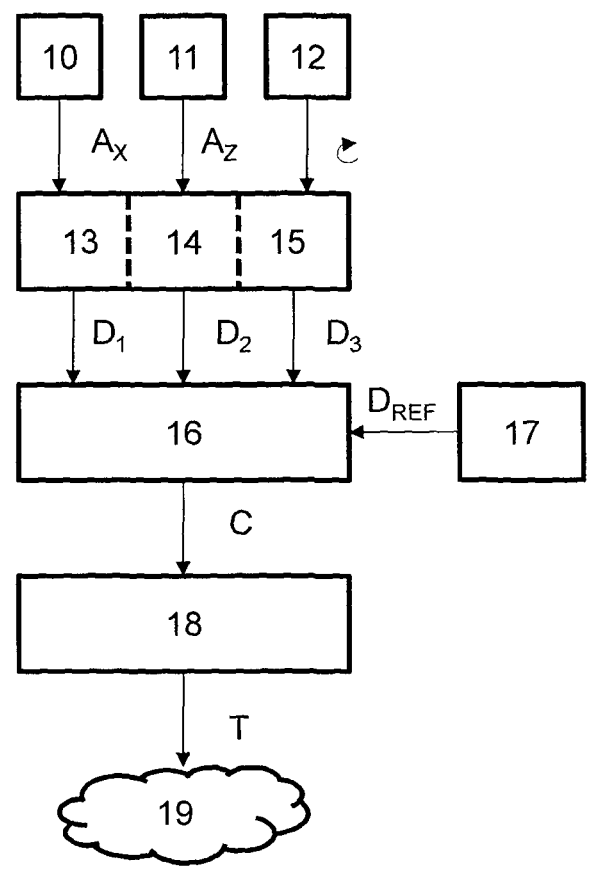
FIG. 3 is a schematic illustration of a large animal vehicle collision safety apparatus according to embodiments herein.

The large animal vehicle collision safety apparatus 1, as illustrated in FIG. 3, comprises at least one sensor 10 for detecting a first acceleration $A_x$ in a longitudinal direction of a host vehicle 1 and means 13 for generating a first determination signal $D_1$ from the detected acceleration $A_x$ in a longitudinal direction of the host vehicle 1.

It further comprises at least one further sensor 11 for detecting a second acceleration $A_z$ in a vertical direction and means 14 for generating a second determination signal $D_2$ from the detected acceleration $A_z$ in a vertical direction, and/or at least one still further sensor 12 for detecting an angular velocity about an axis extending in a lateral direction of the host vehicle 1 and means 15 for generating a third determination signal $D_3$ from the detected angular velocity about an axis extending in a lateral direction of the host vehicle 1. The means 13, 14, 15 for generating the first, second and/or third determination signals $D_1$, $D_2$, $D_3$ may be integrated in one and the same unit, as illustrated through the dashed dividers in FIG. 3.

Still further it comprises means 16 for judging whether the vehicle 1 has suffered a large animal collision through at least comparing the first, second and/or third determination signals $D_1$, $D_2$, $D_3$ with preset reference signals $D_{REF}$, which may be stored in a suitable memory unit 17, and yet further comprises means 18 for triggering braking intervention of the host vehicle 1 when the vehicle 1 is judged to have suffered a large animal collision.

The means for triggering braking intervention 18 may be arranged to trigger Post Impact Braking by a conventional braking system 19 of the vehicle 1, schematically illustrated as a cloud in FIG. 3.

In embodiments of the large animal vehicle collision safety apparatus 1 the means 13, 14, 15 for generating the first, second and third determination signals $D_1$, $D_2$, $D_3$ are arranged to generate these first, second and third determination signals $D_1$, $D_2$, $D_3$ as first and second velocity signals and an angle signal through integrating the first and second accelerations $A_x$, $A_z$ and the angular velocity signal with respect to time. The means 13, 14, 15 for generating the first, second and third determination signals $D_1$, $D_2$, $D_3$ may in embodiments hereof still further be arranged to generate these first, second and third determination signals $D_1$, $D_2$, $D_3$ through integrating the first and second velocity signals and the angle signal with respect to time.

In still further embodiments of the large animal vehicle collision safety apparatus 1 at least one remote sensor (not shown) is arranged to detect objects, such as large animals 5, forward of the host vehicle 1 and output signals representative thereof, and the means 16 for judging whether the vehicle has suffered a large animal collision are arranged to include signals output from the at least one remote sensor in the large animal collision judgment. The at least one remote sensor may in embodiments hereof comprise at least one of a RADAR technology sensor, a LIDAR technology sensor, a vision technology sensor or fusions of sensors based on one or more of these sensing technologies.

A large animal vehicle collision safety method according to embodiments herein comprises the steps of detecting a first acceleration $A_x$ in a longitudinal direction of a host vehicle 1 and generating a first determination signal $D_1$ from the detected acceleration $A_x$ in a longitudinal direction of the host vehicle 1.

It further comprises the steps of detecting a second acceleration $A_z$ in a vertical direction and generating a second determination signal $D_2$ from the detected acceleration $A_z$ in a vertical direction and/or detecting an angular velocity about an axis extending in a lateral direction of the host vehicle 1 and generating a third determination signal $D_3$ from the detected angular velocity about an axis extending in a lateral direction of the host vehicle 1.

Still further it comprises the steps of judging whether the vehicle 1 has suffered a large animal collision through at least comparing the first, second and third determination signals $D_1$, $D_2$, $D_3$ with preset reference signals $D_{REF}$ and triggering braking intervention of the host vehicle 1 when the vehicle 1 is judged to have suffered a large animal collision.

In embodiments of the large animal vehicle collision safety method the first, second and third determination signals $D_1$, $D_2$, $D_3$ are generated as first and second velocity signals and an angle signal through integrating the first and second accelerations $A_x$, $A_z$ and the angular velocity signal with respect to time. The first, second and third determination signals $D_1$, $D_2$, $D_3$ may in embodiments hereof further be generated through integrating the first and second velocity signals and the angle signal with respect to time.

In still further embodiments of the large animal vehicle collision safety method at least one remote sensor is arranged to detect objects, such as large animals 5, forward of the host vehicle 1 and output signals representative thereof, and the judgment whether the vehicle 1 has suffered a large animal collision is arranged to include signals output from the at least one remote sensor. The at least one remote sensor may in embodiments hereof be arranged to comprise at least one of a RADAR technology sensor, a LIDAR technology sensor, a vision technology sensor or fusions of sensors based on one or more of these sensing technologies.

In accordance with the present application is also envisaged an automotive vehicle 1 comprising a large animal vehicle collision safety apparatus based on the above described principles.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

Furthermore, in accordance with the embodiments described herein, the means (e.g., means 13, 14, 15, 16, 18, etc.) for performing the various functions described above may each comprise or further comprise one or more of the following: computer software, hardware or both, such as an Application Specific Integrated Circuit (ASIC), one or more appropriately programmed microprocessors, and/or one or more controllers or control modules.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A large animal collision vehicle safety apparatus comprising:
    at least one sensor for detecting values of a first acceleration in a longitudinal direction of a host vehicle over time;
    means for generating a first determination signal from the detected first acceleration values;
    at least one further sensor for detecting values of a second acceleration in a downward vertical direction over time as a rear suspension of the host vehicle is compressed;
    means for generating a second determination signal from the detected second acceleration values;
    means for judging whether the vehicle has suffered a large animal collision through at least comparing the generated determination signals with preset reference signals based on specific combinations of values indicative of a large animal collision obtained through a simulation and/or full scale trial performed for a specific vehicle model corresponding to the host vehicle; and
    means for triggering braking intervention of the host vehicle when the vehicle is judged to have suffered a large animal collision.

2. An apparatus according to claim 1 further comprising at least one still further sensor for detecting values of an angular velocity about an axis extending in a lateral direction of the host vehicle over time, and the means for generating a third determination signal from the detected angular velocity values, and wherein the means for generating the first, second and third determination signals are operable to generate the first, second and third determination signals as first and second velocity signals and an angle signal, respectively, through integrating the first and second accelerations and the angular velocity with respect to time.

3. An apparatus according to claim 1 further comprising at least one still further sensor for detecting values of an angular velocity about an axis extending in a lateral direction of the host vehicle over time, and means for generating a third determination signal from the detected angular velocity values, and wherein the means for generating the first, second and third determination signals are operable to generate the first, second and third determination signals through integrating the first and second accelerations and the angular velocity with respect to time to obtain first and second velocity signals and an angle signal, respectively, and integrating the first and second velocity signals and the angle signal with respect to time.

4. An apparatus according to claim 1 further comprising at least one remote sensor for detecting objects forward of the host vehicle and for outputting signals representative thereof, wherein the means for judging whether the vehicle has suffered a large animal collision are arranged to include signals output from the at least one remote sensor in the large animal collision judgment.

5. An apparatus according to claim 4 wherein the at least one remote sensor comprises at least one of a RADAR technology sensor, a LIDAR technology sensor, a vision technology sensor or fusions of sensors based on one or more of these sensing technologies.

6. An apparatus according to claim 1 wherein the means for generating the first and second determination signals comprise one or more microprocessors.

7. The apparatus of claim 1 wherein the means for triggering braking intervention of the host vehicle is operable to trigger braking intervention without requiring deployment of an airbag or automatic tensioning of a seat belt.

8. A large animal vehicle collision safety method comprising:
    detecting values of a first acceleration in a longitudinal direction of a host vehicle over time;
    generating a first determination signal from the detected first acceleration values;
    detecting values of a second acceleration in a downward vertical direction over time as a rear suspension of the host vehicle is compressed;
    generating a second determination signal from the detected second acceleration values;
    judging whether the vehicle has suffered a large animal collision through at least comparing the generated determination signals with preset reference signals based on specific combinations of values indicative of a large animal collision obtained through a simulation and/or full scale trial performed for a specific vehicle model corresponding to the host vehicle; and
    triggering braking intervention of the host vehicle when the vehicle is judged to have suffered a large animal collision.

9. The method of claim 8 further comprising detecting values of angular velocity about an axis extending in a lateral direction of the host vehicle over time, generating a third determination signal from the detected angular velocity values, and judging whether the vehicle has suffered a large animal collision through at least comparing the first, second and third determination signals with preset reference signals based on specific combinations of values indicative of a large animal collision obtained through a simulation and/or full scale trial performed for a specific vehicle model corresponding to the host vehicle.

10. The method of claim 9 wherein generating the first determination signal comprises generating the first determination signal as a first velocity signal through integrating the first acceleration values with respect to time, generating the second determination signal comprises generating the second determination signal as a second velocity signal through integrating the second acceleration values with respect to time, and generating the third determination signal comprises generating the third determination signal as an angle signal through integrating the angular velocity values with respect to time.

11. The method of claim 9 wherein generating the first determination signal comprises generating the first determination signal through second order integration of the first acceleration values, generating the second determination signal comprises generating the second determination signal through second order integration of the second acceleration values, and generating the third determination signal comprises generating the third determination signal through second order integration of the angular velocity values.

12. The method of claim 8 wherein triggering braking intervention of the host vehicle occurs without requiring deployment of an airbag or automatic tensioning of a seat belt of the vehicle.

13. An automotive vehicle comprising:
    a rear suspension;
    at least one sensor for detecting values of a first acceleration in a longitudinal direction of the vehicle over time;

means for generating a first determination signal from the detected first acceleration values;

at least one further sensor for detecting values of a second acceleration in a downward vertical direction over time as the rear suspension is compressed;

means for generating a second determination signal from the detected second acceleration values;

means for judging whether the vehicle has suffered a large animal collision through at least comparing the generated determination signals with preset reference signals based on specific combinations of values indicative of a large animal collision obtained through simulations and/or full scale trials performed for a specific vehicle model corresponding to the host vehicle; and means for triggering braking intervention of the vehicle when the vehicle is judged to have suffered a large animal collision.

14. The vehicle according to claim 13 further comprising at least one still further sensor for detecting values of an angular velocity about an axis extending in a lateral direction of the vehicle over time, and means for generating a third determination signal from the detected angular velocity values, and wherein the means for generating the first, second and third determination signals are arranged to generate the first, second and third determination signals as first and second velocity signals and an angle signal, respectively, through integrating the first and second accelerations and the angular velocity with respect to time.

15. The vehicle according to claim 13 further comprising at least one still further sensor for detecting values of an angular velocity about an axis extending in a lateral direction of the vehicle over time, and means for generating a third determination signal from the detected angular velocity values, wherein the means for generating the first, second and third determination signals further are operable to generate the first, second and third determination signals through integrating the first and second accelerations and the angular velocity with respect to time to obtain first and second velocity signals and an angle signal, respectively, and integrating the first and second velocity signals and the angle signal with respect to time.

16. The vehicle according to claim 13 further comprising at least one remote sensor for detecting objects forward of the vehicle and for outputting signals representative thereof, wherein the means for judging whether the vehicle has suffered a large animal collision are arranged to include signals output from the at least one remote sensor in the large animal collision judgment.

17. The vehicle according to claim 16 wherein the at least one remote sensor comprises at least one of a RADAR technology sensor, a LIDAR technology sensor, a vision technology sensor or fusions of sensors based on one or more of these sensing technologies.

18. The vehicle according to claim 13 wherein the means for generating the first and second determination signals comprise one or more microprocessors.

19. The vehicle of claim 13 wherein the means for triggering braking intervention of the vehicle is operable to trigger braking intervention without requiring deployment of an airbag or automatic tensioning of a seat belt.

* * * * *